United States Patent [19]

Zavasnik

[11] 3,926,324

[45] Dec. 16, 1975

[54] PLASTIC CONTAINER FOR PRESSURIZED LIQUID

[75] Inventor: Fred J. Zavasnik, Justice, Ill.

[73] Assignee: Continental Can Company, Inc., New York, N.Y.

[22] Filed: May 2, 1974

[21] Appl. No.: 466,193

Related U.S. Application Data

[63] Continuation of Ser. No. 197,750, Nov. 11, 1971, abandoned.

[52] U.S. Cl. .................. 215/1 C; 220/3; 220/70
[51] Int. Cl. ............................. B65d 23/00
[58] Field of Search ........ 215/1 C, 11 R; 220/3, 3.1, 220/70

[56] References Cited
UNITED STATES PATENTS

| | | | |
|---|---|---|---|
| 2,982,440 | 5/1961 | Harrison | 220/66 |
| 3,726,429 | 4/1973 | Doughty | 215/1 C |

*Primary Examiner*—William I. Price
*Assistant Examiner*—Steven M. Pollard
*Attorney, Agent, or Firm*—Diller, Brown, Ramik & Wight

[57] ABSTRACT

A container made from a thermoplastic material having a cylindrical sidewall and bottom skirt, with an interior hemispherically shaped end portion, and apparatus for making same.

6 Claims, 7 Drawing Figures

U.S. Patent  Dec. 16, 1975  Sheet 1 of 2  3,926,324
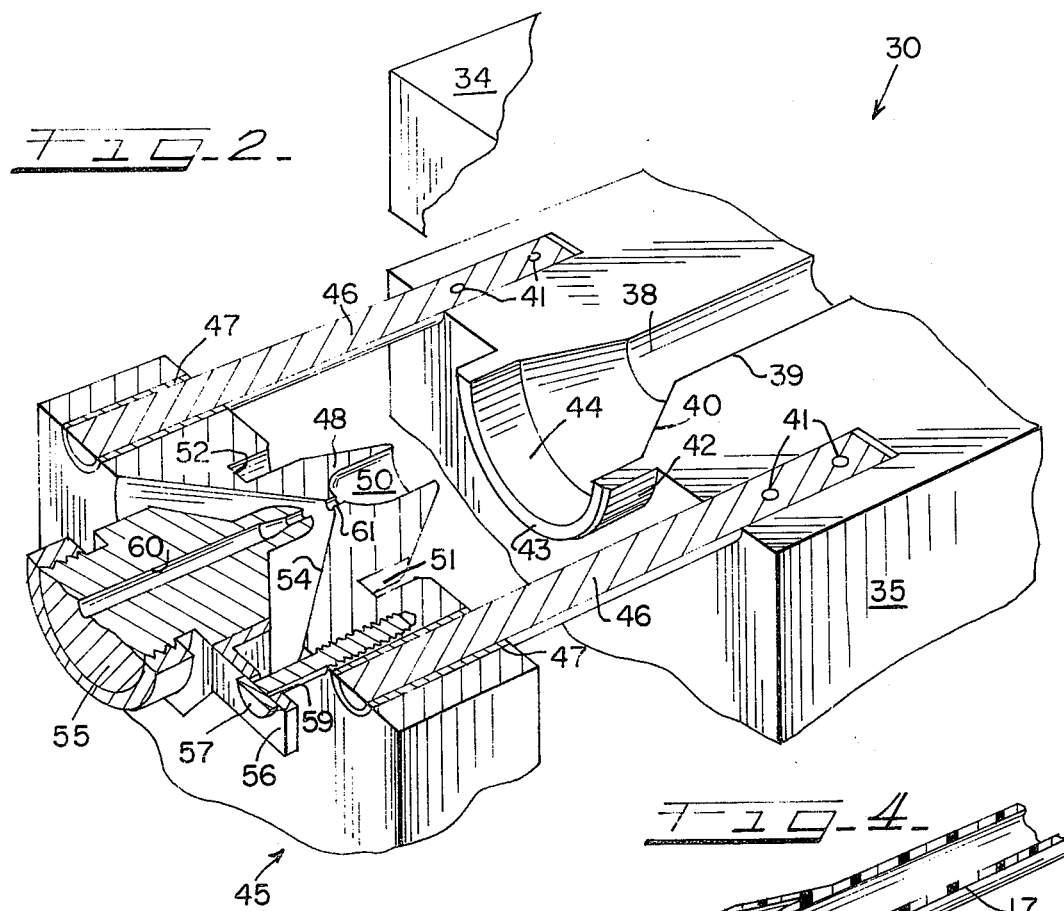
Fig. 2.
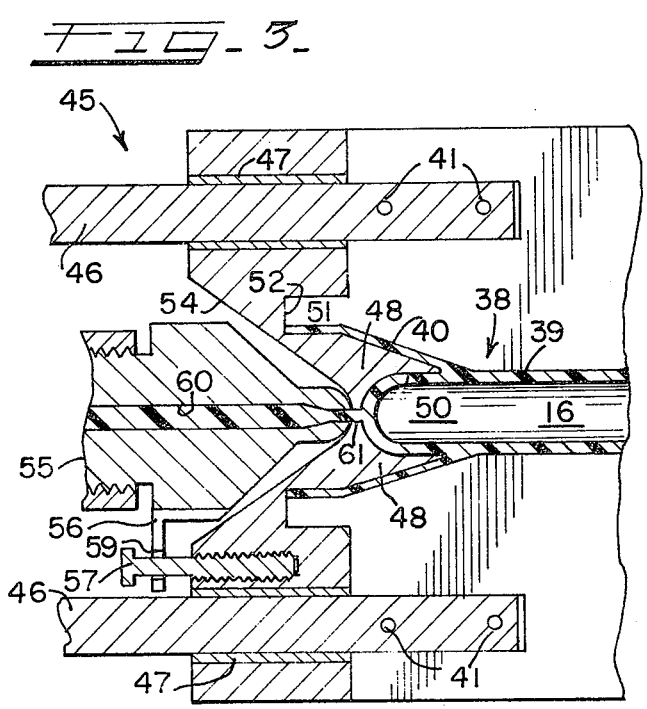
Fig. 3.
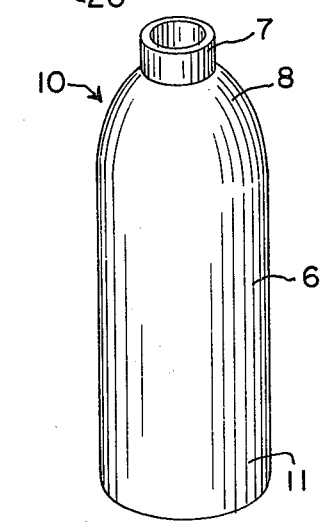
Fig. 4.
Fig. 1.

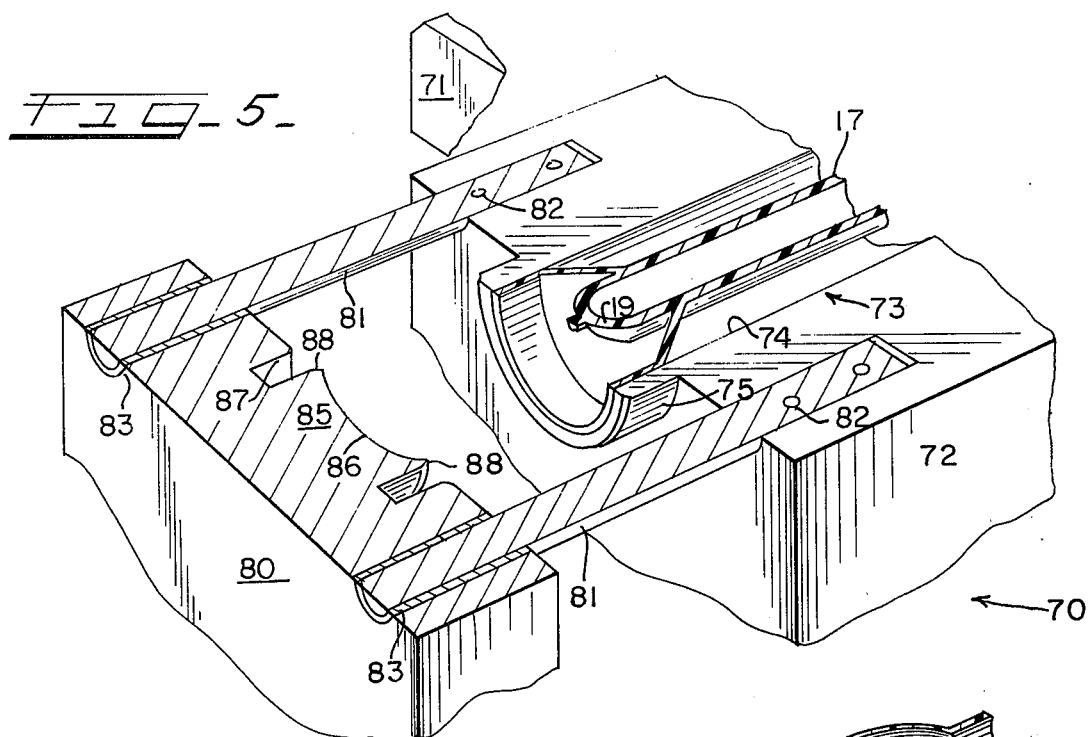
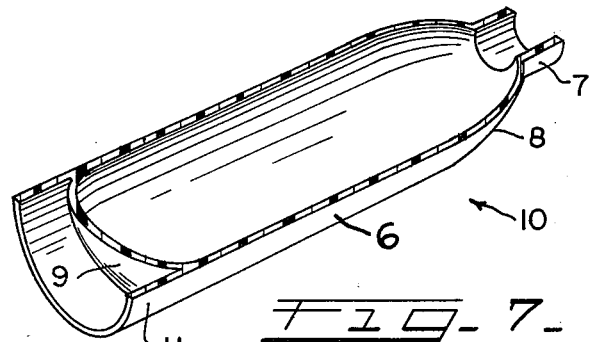
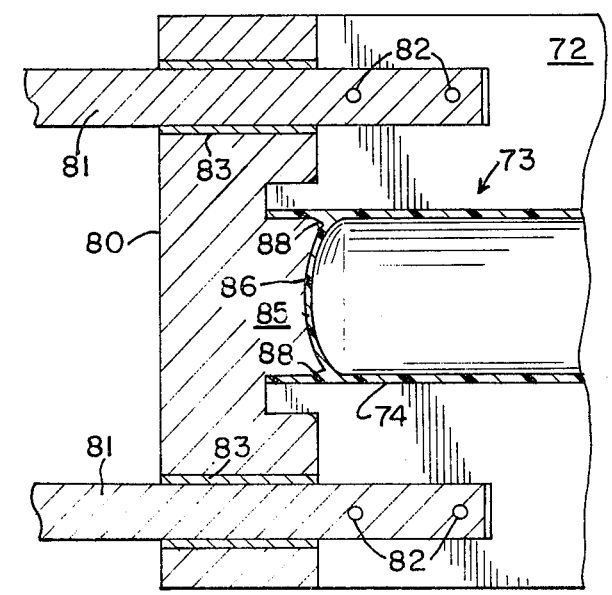

PLASTIC CONTAINER FOR PRESSURIZED LIQUID

This is a continuation of Ser. No. 197,750, filed Nov. 11, 1971, now abandoned.

BACKGROUND OF THE INVENTION

This invention relates to containers formed of a thermoplastic material which are suitable for containing pressurized liquids such as beer and other beverages, as well as injection blow molding apparatus for making same.

PRIOR ART

Containers for pressurized liquids have heretofore been made primarily of glass. Plastic containers, although suitable from the standpoint of potability, have been less acceptable primarily because they are relatively expensive and have a tendency to deform and creep due to pressure exerted by the liquid. When thermoplastic bottles are utilized for such purposes, sufficient strength may be imparted to the sidewalls through orientation of the polymer chains even though the wall thicknesses do not exceed 50 mils. However, the weakest part of such a bottle is often the bottom end which may bulge or blow out, or split at the juncture with the sidewall. Such weaknesses cannot be overcome merely by making the bottle thicker since additional material requirements increase the cost, and secondly, because a flat bottom results in lower capacity per unit of material.

It has been proposed to form a plastic bottle with a concave, oriented bottom so as to provide resistance to such creep, and to subsequently provide a skirt or jacket of plastic or paper material so as to make the container free standing. However, this two-step manufacturing process of first forming and subsequently providing a bottle support is not economical, both in terms of cycle time and in terms of the diverse manufacturing operations.

SUMMARY OF THE INVENTION

In order to overcome the deficiencies of the prior art, the instant plastic container includes a hollow cylindrical member terminating in a mouth at one end which is adapted to receive a closure, and having a cylindrical, integrally formed flat base at the other end. Within the cylindrical base is a hemispherical closure in which the polymeric chains are biaxially oriented in the forming process. The invention herein also includes a novel injection mold to form a parison which can subsequently be expanded in a blow mold to achieve the desired shape so as to overcome the disadvantages of the prior art relating to the weak bottom ends.

Accordingly, it is an object of this invention to provide a one-piece self-supporting lightweight container having a concave interior bottom which is highly resistant to creep and deformation and which is provided with a horizontal cylindrical bottom skirt to provide the container with a free standing capability. It is another object of this invention to provide a plastic beverage bottle suitable for internal pressurization having an interior end which utilizes a minimum amount of thermoplastic material in relation to the volumneric capacity of the container. Similarly, it is an object of the invention to provide a container of thermoplastic material in which all of the walls as well as the bottom thereof have been biaxially oriented so as to enhance the strength characteristics of the container and its resistance to creep.

Finally, it is an object of the instant invention to provide injection and blow molds which will permit the manufacture of such a container from a single plug of thermoplastic material whereby the concave bottom of the container and the cylindrical skirt thereon are formed integrally.

DESCRIPTION OF THE DRAWINGS

The manner in which the objects of this invention are attained will be made clear by a consideration of the following specification and claims when taken in conjunction with the drawings in which:

FIG. 1 is a perspective view of the container;

FIG. 2 is an exploded perspective view partially in section of an injection mold utilized to form a parison from which the container of FIG. 1 is formed;

FIG. 3 is a sectional view taken along the horizontal center line of the injection mold in its closed position;

FIG. 4 is a perspective view taken in section along the center line of the parison formed within the injection mold of FIG. 3;

FIG. 5 is an exploded perpective view of the expansion mold of the instant invention taken partially in section;

FIG. 6 is a plan view taken along the center line of the expansion mold apparatus in its closed position; and FIG. 7 is a perspective view in section taken along the center line of the container.

DESCRIPTION OF THE PREFERRED EMBODIMENT

As depicted in FIGS. 1 and 7 of the preferred embodiment, the container 10 of my invention may include a cylindrical member 6 having a bottom skirt 11 which is flat and permits the container to be free standing and an upper end 8 having a decreasing diameter which terminates in a neck 7 to form a mouth for the bottle and upon which a closure may be placed. Within the skirt 11 is a closure 9 which has a hemispherical shape and extends between the walls 6 so as to complete the container.

Such a container is initially formed in the shape of a parison 15 as depicted in FIG. 4 within the injection mold 30 of FIG. 2. As illustrated, the injection mold 30 comprises a lower mold section 35 and an upper mold section 34 which may be joined together by tie rods and actuated by hydraulic motors for closing, preferably in a vertical direction. When closed, these mold sections will define a cavity 38 including a cylindrical section 39 for enclosing a core or blow stick 16 (see FIG. 3) and a conical section 40, which terminates in an annular grove 44 of an annular extension 42 of the upper and lower mold sections.

To complete the injection mold is an end section 45 which is rectangular in external construction, but provides an annular internal shape so as to complete the cavity 38. This section 45 is joined to the other mold sections by guide rods 46 which ride in bushings 47 within the end section 45, and which are preferably attached to the lower mold section 35 by pins or other constraining means 41. The rear face of end section 45 has a conical section 54 adapted to receive the nozzle 55 of an injection molding machine. This nozzle is connected to the end section 45 by a one-way connection comprising a bracket 56 attached to nozzle 55 and a pin 57 threadably engaged with the end section 45. An aperture 59 within the bracket 56 has a larger internal diameter than the external diameter of the pin 57 and thus permits the nozzle 55 upon forward movement by an hydraulic ram or other means (not shown) to sealingly engage with the apex of the cone 54 whereby a plasticizing material may be injected through the aperture 60, an aperture 61 in section 45 and into the cavity 38. For purposes of convenience, it is contemplated that the hydraulic motor which urges the nozzle 55 forwardly against its seat within the cone 54 will also carry the entire end section 45 forwardly so as to complete the injection mold.

With further reference to the end piece 45, it will be seen that a cone section 48 extends into the cavity 38 of the upper and lower sections of the injection mold and this cone section is provided with a counter bore or cylindrical cavity 50 into which the core 16 will extend.

Thus, in its closed position, the annular ring 42 formed by the upper and lower mold sections upon closing will extend over the cone section 48 of the end piece 45 to seat within a recess 51 formed in the end section. Surface 43 will then sealingly engage a surface 52 so as to contain a plasticized material within the injection mold as shown in FIG. 3.

It should be clear from FIGS. 2 and 3 that clearances are provided within the mold sections so as to form a parison 15 (as depicted in FIG. 4) about core 16 having cylindrical walls 17, a conical skirt 18 and a cylindrical base 20. Further, a hemispherical end 19 is formed within the conical skirt 18 as shown. Preferably, the parison is formed with a relatively thin cylindrical base 20 and skirt 18, with the end 19 and the cylindrical walls 17 being of the greater thickness. These thin walls will permit more rapid cooling thereof and insure that the parison will substantially maintain its shape when it is transferred from the injection mold to the blow mold, subsequently to be described.

In FIGS. 4, 5 and 6, this blow mold 70 is depicted as being of a construction similar to the injection mold 30. It may comprise an upper mold section 71 and a lower mold section 72 as well as an end section 80. Additionally, tie rods (not shown) may guide the vertical movement of the upper section so that it will properly engage the lower section with an hydraulic motor being utilized to effect this vertical movement. Within a cavity 73 formed by the upper and lower mold sections is a reduced diameter portion (not shown) terminating in a neck and a lower cylindrical portion 74 of constant diameter against which the parison walls 17 are to be expanded. Extending rearwardly of the upper and lower mold sections is an annular ring 75 formed upon closing of the molds which is intended to mate with an annular recess 87 within the end section 80.

The end section 80, like the injection mold, is affixed to the lower mold section 72 by guide rods 81 and pins 82 or other retaining means while a bushing 83 is placed in the otherwise rectangular-shaped end piece 80 to provide accurate alignment thereof with the other two mold sections so as to complete the cavity 73. Upon the forward face of the end section is an annular projection 85 carrying a hemispherical surface 86 surrounded by an annular grove 87 which receives ring 75 of the upper and lower mold halves, as well as the annular ring 20 of the parison 15. Champfered surfaces 88 on projection 85 may help guide the ring 20 into the grove 87. Thus, upon insertion of the parison into the blow mold, the admission of air or other fluid to the core or blow stick 16 will cause the parison to expand so as to take the shape of the container 10. The conical skirt 18 will be expanded outwardly against the cavity walls such that the skirt becomes substantially vertical as shown in FIG. 1, and the end 19 is expanded both axially and radially against surface 86 to form the bottom 9 of the container.

MODE OF OPERATION

In forming the parison of FIG. 4, the upper mold section 34 will be lowered into engagement with section 35 to close about the core 16 with the section 45 being reciprocated along the guide rods 46 so as to complete the cavity. An hydraulic motor (not shown) actuating the nozzle 55 will first urge the nozzle forward until it makes contact with the end section 45 at its conical portion 54 thereof. Continued forward movement will seat the surfaces 43 and 52 of the cylindrical section 42 and the annular recess 52 together so as to form a seal. Subsequently, the plasticized material is injected through the nozzle 55 into the injection mold so as to form a parison as illustrated in FIG. 4. The end section 45 is then retracted by an hydraulic motor connected to the nozzle 55 with the upper mold section 34 being raised. The parison 17 is then lifted from mold section 35 and transferred to the blow mold 70 with the upper mold section being closed over it. Subsequently, an hydraulic motor will reciprocate the end section 80 against the upper and lower molds so as to complete the cavity. The admission of air or other fluid through the blow stick 16 will then cause the parison to expand against the interior walls of the cavity with such expansion causing the conical skirt portion 18 of the parison 15 to expand against the sidewalls thereof. Simultaneously, it should be quite apparent that the hemispherical end 19 of the parison 15 will be expanded downwardly against the concave end portion 86 of the mold 80. Such expansion will obviously stretch the polymeric material in at least two directions, and if the parison is at the proper temperature, the polymeric chains thereof will be biaxially oriented so as to form a bottom section having substantial resistance to creep. The mold 70 is then opened, and the blown article may be removed from the core by conventional means.

It should be quite apparent that the instant invention is not necessarily limited to the formation of a container having a hemispherical end section but includes various concave shapes and yet permits the opening of both the injection and blow mold. Accordingly, it should be quite apparent that with utilization of the instant injection and blow mold apparatus, an integrally formed hollow article may be manufactured. Further, it should be quite evident that this hollow article will have a flat rectangular base permitting a free standing capability of the article, with a hemispherical section within said article which is formed by expansion in at least two directions so as to obtain a biaxial orientation.

I claim:

1. A hollow article comprising a unitary thermoplastic material free of bonds of a weld type defining a line of juncture and defining:
   a. a hollow cylindrical member having a reduced shoulder portion at one end and terminating in a neck portion defining a mouth adapted to receive a closure, and an internally concave projecting closure at the other end of said cylindrical member, said projecting closure being entirely recessed within a cylindrical depending portion of said cylindrical member.

2. The hollow article of claim 1 wherein said thermoplastic material is an injection molded product.

3. The hollow article of claim 1 wherein said other end of said cylindrical member has a terminal free edge disposed in axially spaced relation to the connection between said concave closure and said cylindrical member.

4. The hollow article of claim 1 wherein a portion of said cylindrical member is of an injection molded shaping and the remainder of said cylindrical member is of a blow molded shaping.

5. The hollow article of claim 1 wherein said cylindrical member in part defines a container body and in part defines a skirt, and wherein said container body is of a blow molded shaping.

6. The hollow article of claim 1 wherein said cylindrical member in part defines a container body and in part defines a skirt, and wherein said container body is of a blow molded shaping, said skirt having a free terminal end portion, and at least said free terminal end portion is of an injection molded shaping.

* * * * *